US011951706B2

(12) United States Patent
Hagestedt

(10) Patent No.: US 11,951,706 B2
(45) Date of Patent: Apr. 9, 2024

(54) DEVICE FOR DISPENSING A PADDING MATERIAL FOR PACKAGING PURPOSES

(71) Applicant: Storopack Hans Reichenecker GMBH, Metzingen (DE)

(72) Inventor: Lukas Hagestedt, Esslingen (DE)

(73) Assignee: Storopack Hans Reichenecker GmbH, Metzingen (DE)

( * ) Notice: Subject to any disclaimer, the term of this patent is extended or adjusted under 35 U.S.C. 154(b) by 704 days.

(21) Appl. No.: 16/633,211

(22) PCT Filed: Jul. 24, 2018

(86) PCT No.: PCT/EP2018/070051
§ 371 (c)(1),
(2) Date: Jan. 23, 2020

(87) PCT Pub. No.: WO2019/020633
PCT Pub. Date: Jan. 31, 2019

(65) Prior Publication Data

US 2020/0238652 A1 Jul. 30, 2020

(30) Foreign Application Priority Data

Jul. 25, 2017 (DE) ..................... 10 2017 116 837.0

(51) Int. Cl.
*B31D 5/00* (2017.01)

(52) U.S. Cl.
CPC ......... *B31D 5/0047* (2013.01); *B31D 5/0073* (2013.01); *B31D 2205/0047* (2013.01);
(Continued)

(58) Field of Classification Search
CPC ........................................................ B31D 5/00
(Continued)

(56) References Cited

U.S. PATENT DOCUMENTS 5,989,176 A * 11/1999 Ratzel .................. B31D 5/0047 493/464
6,217,501 B1 * 4/2001 Simmons, Jr. ....... B31D 5/0047 493/464
(Continued)

FOREIGN PATENT DOCUMENTS

DE 102012218679 A1 4/2014
EP 0889779 B1 7/2002
EP 0776760 B2 12/2006

OTHER PUBLICATIONS

European Patent Office; Search Report and Written Opinion in related Internatinal Patent Application No. PCT/EP2018/070051 dated Oct. 24, 2018; 9 pages.

*Primary Examiner* — Praachi M Pathak
(74) *Attorney, Agent, or Firm* — Wood Herron & Evans LLP

(57) ABSTRACT

The invention relates to a device for dispensing a cushion means for packaging purposes, comprising a dispensing means which provides the cushion means, and a withdrawal region from which a user can take the dispensed cushion means. At least one sensor means is present, which detects an engaging of the dispensed cushion means by the user and/or the presence or absence of at least one region of a hand of the user in the withdrawal region or in a detection region adjacent to the withdrawal region. The providing device dispenses a cushion means depending on the detected engaging of the dispensed cushion means by the user and/or depending on the presence and/or absence of a hand of the user in the withdrawal region or in the detection region.

12 Claims, 4 Drawing Sheets

(52) U.S. Cl.
CPC ................ *B31D 2205/0058* (2013.01); *B31D 2205/0082* (2013.01); *B31D 2205/0088* (2013.01)

(58) Field of Classification Search
USPC .......................................................... 493/464
See application file for complete search history.

(56) References Cited

U.S. PATENT DOCUMENTS

| | | | | |
|---|---|---|---|---|
| 6,416,451 | B1 * | 7/2002 | Ratzel | B31D 5/0047 493/464 |
| 6,475,130 | B1 * | 11/2002 | Simmons | B65G 47/29 493/464 |
| 6,626,813 | B1 * | 9/2003 | Ratzel | B65H 18/08 493/464 |
| 10,576,707 | B2 * | 3/2020 | Park | B31D 5/0043 |
| 2011/0053743 | A1 * | 3/2011 | Wetsch | B31D 5/0047 493/464 |
| 2011/0053744 | A1 * | 3/2011 | Wetsch | B31D 5/0052 493/464 |
| 2013/0296154 | A1 * | 11/2013 | Sip | B31D 5/0047 493/464 |
| 2014/0113794 | A1 * | 4/2014 | Deis | B31D 5/006 493/464 |
| 2016/0101585 | A1 * | 4/2016 | Park | B31D 5/0047 493/24 |
| 2016/0151991 | A1 * | 6/2016 | Wetsch | B26F 3/02 493/352 |
| 2016/0257474 | A1 | 9/2016 | Eckel | |

* cited by examiner

DEVICE FOR DISPENSING A PADDING MATERIAL FOR PACKAGING PURPOSES

The invention relates to a device for dispensing a cushion means for packaging purposes according to the preamble of claim 1.

Devices of the type mentioned are known for example from DE 10 2012 218 679 A1 and US 2016/0257474 A1. From the first-mentioned document, a device is known, which comprises a dispensing means, by means of which the cushion means can be produced of crumpled paper. From the second-mentioned document, a device is known which comprises a dispensing means by means of which cushion means can be produced from air-filled bags. Other devices known in the marketplace include dispensing means which dispense foam cushion means, for example in the form of chips or pellets ("loose fill") or in the form of bags filled with a self-foaming material.

The prior art also includes EP 0 776 760 B2 and EP 0 889 779 B1. The former publication describes a device for dispensing cushion means, in which a sensor means is provided, which detects the withdrawal of a cushion means from an outlet of the device. The second mentioned publication discloses that a signal is provided to produce a further cushion means after a cushion means has been withdrawn at an output location.

Based on the cited prior art, the object of the present invention is to provide a device for which on the one hand a high reliability is ensured, and on the other hand, a largely automatic production of cushion means at the request of a user ("on-demand mode") is possible.

This problem is solved by a device having the features of claim 1. Advantageous developments are specified in subclaims. Furthermore, there are important features for the invention in the following description and in the drawing. These features may be essential for the invention both alone and in different combinations, without being explicitly referred to again.

According to the invention, a device for dispensing a cushion means for packaging purposes is proposed, which comprises a dispensing means which dispenses the cushion means. Furthermore, the device includes a withdrawal region, on which a user can remove the dispensed cushion means that can be withdrawn. The device comprises at least one sensor means which at least indirectly detects engaging the provided cushion means by the user. Alternatively or additionally, preferably in or at the withdrawal region, a sensor means is present, which detects, at least indirectly, the presence or absence of at least one region of a hand of the user in the withdrawal region or in a detection region directly adjacent to the withdrawal region.

Unlike in the prior art, the device according to the invention is not based on the presence or absence of a cushion means at a particular location, but on whether the user of the device engages the cushion means dispensed for withdrawal or grasps into the device for withdrawing the dispensed cushion means. By means of the sensor means provided according to the invention, on the one hand the safety and reliability of the device according to the invention is increased. Namely, the sensor means makes it possible, when it is detected that a user is engaging the dispensed cushion means and/or that at least a region of a hand of the user is present in the withdrawal region, to interrupt or stop the dispensing of cushion means. Analogously to this, the sensor means allows dispensing the cushion means in the withdrawal region only when it is detected that the user is not engaging the dispensed cushion means and/or that a hand of the user is no longer present in the withdrawal region. A congestion in a region upstream of the withdrawal region is thereby avoided.

Also, the grasping of a cushion means is facilitated by the hand of the user, since the provided cushion means is stationary at the moment of engaging, thus remaining unmoved. It is also possible, however, that when an engaging by the user of the dispensed cushion means and/or the presence of a hand of the user is detected in the withdrawal region or in the detection region immediately adjacent to the withdrawal region, the dispensing of cushion means is first initiated so that after the user has engaged the cushion means and/or after moving at least one region of the hand of the user into the withdrawal region or into the detection region immediately adjacent to the withdrawal region, a cushion means is provided in the withdrawal region, which can be grasped.

Overall, this allows operation of the device depending on engaging the cushion means dispensed for withdrawal by the user and/or the presence or absence of at least a region of a hand of the user in the withdrawal region, whereby on the one hand increased reliability and on the other hand an "on-demand-mode" can be provided, in which the user can influence the production of cushion means by a movement of his hand, whereby the productivity can be increased considerably.

In a first development, it is proposed that the dispensing means dispenses the cushion means such that a first region of the cushion means that can be withdrawn is detachably connected to a second region of the cushion means, and that the sensor means detects at least an indirect action by the user on the second region of the cushion means with the withdrawal of the first region of the cushion means. This is based on the consideration that the cushion means can be provided for example in the form of an initially still contiguous strand of individual regions, which are connected to each other, for example by material weakening, for example in the form of perforations. A first region, which is provided for withdrawal, can be detachably connected in this way to a second region, which is not yet provided for removal. In principle, however, it is not absolutely necessary for a perforation to be present. Another material weakening is conceivable, or no material weakening at all, but rather an aid which can separate the two adjacent regions. For example, an aid may be a cutting means.

If the user disconnects the first region from the second region, for example by tearing it off, this acts on the second region insofar as, for example, a tensile force is exerted on the second region. The sensor means can now detect, at least indirectly, this tensile force or any other parameter of the second region which changes when the first region is separated from the second region. The term "indirectly" should indicate in the present case that the parameter can also be detected, for example, on a component of the dispensing means which experiences an effect when the first region is separated from the second region.

This development has the advantage that it can be used to detect a separation (or at least the attempt to separate off) of the first region from the second region in a very concrete manner. This allows a very precise and secure control of the device and thus a safe and precise production and dispensing of cushion means.

In a further development, it can be provided that the dispensing means comprises a motor drive, and that the sensor means detects a change in state of the motor drive due to the at least indirect action by the user on the second region of the cushion means. Such a state change may take place, for example, at a torque or a force that occurs on a rotor or on a stator or a mount of the motor drive, or at a current value which is detected by a corresponding sensor. This is very easy to implement and can even be retrofitted under certain circumstances.

Another variant provides that the sensor means changes a signal state when at least one region of a hand reaches the withdrawal region or the detection region. In this way, the sensor means can reliably and simply detect when a user moves a hand into the withdrawal region or into the detection region. Thus, the at least temporary presence of at least one region of the hand is detected (it can be seen that the term "detecting the presence of a hand in the withdrawal region or in the detection region" according to the invention also means that the movement of the hand into the withdrawal region or into the detection region is detected).

Alternatively or additionally, it is possible that the sensor means changes a signal state when a hand leaves the withdrawal region or the detection region. In this way, the sensor means can reliably and easily detect when a user moves a hand out of the withdrawal region or out of the detection region. Thus, the at least temporary absence of the hand is detected (it can be seen that the term "detecting the absence of a hand in the withdrawal region or in the detection region" according to the invention also means that the retracting of the hand from the withdrawal region or from the detection region is detected).

Especially if a hand of the user is to be detected, a simple and so far particularly inexpensive realization of such a sensor means consists in that the sensor means comprises a light barrier, an image recognition means, an infrared detector and/or an ultrasound detector, respectively in or on the withdrawal region or the detection region. In this case, an image recognition device has the advantage that it can provide even more information that is important for the control of the device. For example, it can be detected whether the hand is open in the withdrawal region or in the detection region, or it can be detected whether the hand has a specific size in the withdrawal region or in the detection region, and depending on this, a corresponding number and/or size of cushion means is dispensed, or the number of outstretched fingers of the hand can be detected such that a corresponding number and/or size of cushion means is provided.

Especially when engaging the cushion means by the user is to be detected, a further realization of a sensor means is that the sensor means comprises a torque sensor, a force transducer and/or a current sensor, in each case at the motor drive of the dispensing means. These are sensors that are easy to implement and can detect a "manipulation," that is, for example, a separation of the above-mentioned first region from the second region.

It is also possible that the withdrawal region is arranged directly on the dispensing means. As a result, a very compact device is realized.

Alternatively, it is proposed that the withdrawal region is arranged away from the dispensing means, and that a transport means is arranged between the dispensing means and the withdrawal region, which transports a cushion means dispensed by the dispensing means to the withdrawal region. This allows the transport of dispensed cushion means, for example, to a packing station, without requiring the space for a complete dispensing means at the packing station.

In this case, it is particularly preferred if the transport means transports a cushion means depending on engaging the provided cushion means by the user and/or on the detected presence and/or absence of at least one region of a hand of the user in the withdrawal region or in the detection region.

It is also possible that the dispensing device dispenses a cushion means depending on the detected engaging of the user on the dispensed cushion means and/or depending on the presence and/or absence of a hand of the user in the withdrawal region or in the detection region. Thus, an automated operation of the device is possible, which significantly increases the efficiency.

A further advantageous embodiment of the device according to the invention provides that the transport means only initiates a transport after expiration of a predetermined time interval after a detected engaging of the dispensed cushion means by the user and/or for a detected presence and/or absence of a hand of the user in the withdrawal region or in the detection region, and/or that the dispensing means only dispenses a cushion means after a predetermined time interval after a detected engaging of the dispensed cushion means by the user and/or detected presence and/or absence of at least a region of a hand of the user in the withdrawal region or in the detection region. As a result, the operation of the device is made even safer and more convenient.

It is also proposed that the withdrawal region or the detection region extends over a length, and the sensor means which detects the presence and/or absence of at least one region of a hand of the user in the withdrawal region or in the detection region is arranged and formed such that it acts over the entire length of the withdrawal region or the detection region. This is particularly advantageous in the case of a withdrawal region or detection region extending for example linearly. Thus, the operation of the device can be influenced by a hand of the user irrespective of the location within the withdrawal region where the hand of the user enters or retracts out of the withdrawal region.

Hereinafter, embodiments of the invention will be explained with reference to the accompanying drawings, in which.

Hereinafter, in various embodiments, those elements and regions having equivalent functions to elements and regions of an embodiment previously described are designated by the same reference numerals. Normally they will not be explained again in detail.

Figure 1:
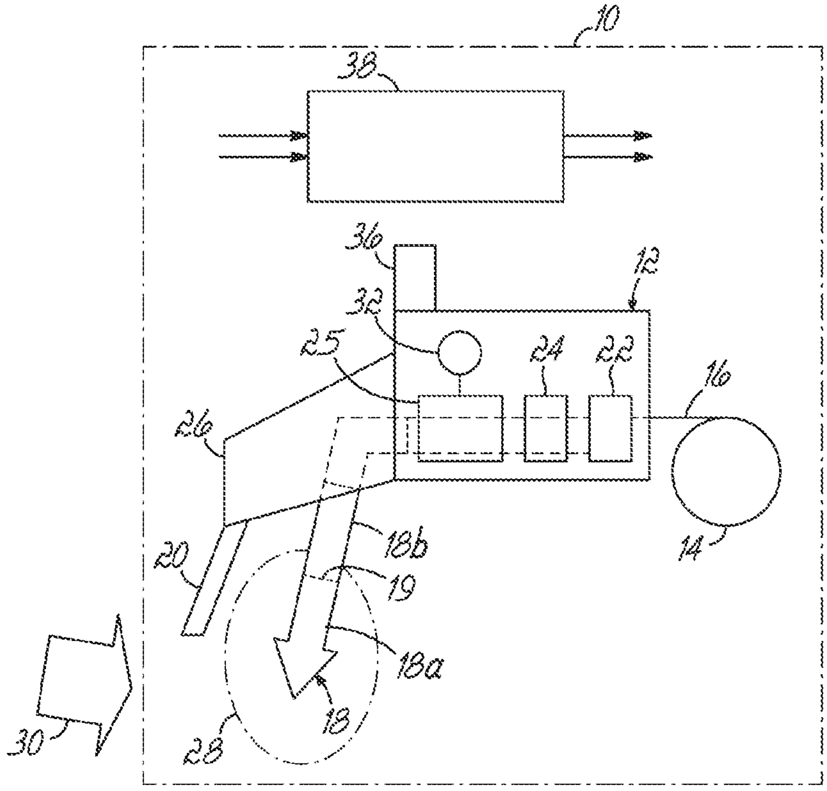
FIG. 1 shows a schematic representation of a first embodiment of a device for dispensing a cushion means for packaging purposes.

A device for dispensing a cushion means for packaging purposes is overall designated by the reference numeral 10 in FIG. 1. It is indicated schematically by a dot-dashed box. The device 10 comprises a dispensing means 12 which dispenses the cushion means. In the present case, the dispensing means 12 converts a flat sheet-like starting material 16 provided on a roll 14 into a three-dimensional cushion means, which in FIG. 1 is indicated only schematically and overall by an arrow 18. Alternatively, the starting material 16 could also be provided in the form of a zig-zag folded stack.

In many of the exemplary embodiments of devices 10 explained below, it is basically conceivable to have completely different types of cushion means 18 and corresponding dispensing means 12. For example, the cushion means may consist of crumpled paper. In this case, the starting material 16 would be sheet paper, and the dispensing means 12 would comprise a crumpling means which converts the sheet paper into crumpled paper and a cutter that cuts the crumpled paper into individual cushion-like cushion means.

However, it is also possible that the cushion means 18 are air-filled bags made of a plastic film. In this case, the starting material 16 would consist of an initially likewise sheet-like and flat film tube, and the dispensing means 12 would comprise a filling device and a sealing device which fills the web-shaped film tube with air or seals it after filling. In most cases, such a film tube has perforations, so that the user can tear off one or more air-filled bag(s).

In the present case, it is assumed by way of example that the dispensing means 12 shown in FIG. 1 provides such air-filled bags 18*a*, 18*b*, . . . . These individual bags 18*a* and 18*b* are each releasably connected to each other by a perforation 19, so that a kind of strand of bags 18*a*, 18*b*, . . . is formed. In this respect, the first "protruding" bag 18*a* forms a first region of the cushion means 18 dispensed for withdrawal, whereas the second bag 18*b* forms a second region of the cushion means 18 not yet intended for removal.

A tear-off device, which facilitates the user tearing off a bag 18 is indicated in FIG. 1. It is designated by the reference numeral 20. The above-mentioned filling device is designated by the reference numeral 22 and the above-mentioned sealing device is designated by the reference numeral 24. A motor drive in the form of a feed motor, which conveys the starting material 16 through the filling device 22 and the sealing device 24, is designated by the reference numeral 25 in FIG. 1.

From a machine output 26 of the dispensing means 12, the cushion means 18 passes into a withdrawal region 28, which in the present case is indicated by a dot-dashed oval. In the present case, the withdrawal region 28 is therefore arranged directly on the dispensing means 12. A cushion means 18 provided in this withdrawal region 28 can be withdrawn by a user. For this purpose, the user introduces a hand from the side (as shown by an arrow 30) or from below (not shown) into the withdrawal region 28.

In the region of the motor drive 25, a sensor means 32 is present. This is designed such that it detects at least an indirect action by the user on the second region 18*b* of the cushion means 18 with the withdrawal of the first region 18*a* of the cushion means 18. For this purpose, the sensor means 32 detects a change in the state of the motor drive 25 due to the at least indirect action by the user on the second region 18*b* of the cushion means 18.

For example, the sensor means 32 may comprise a torque sensor, a force sensor and/or a current sensor. In the case of a torque sensor or a force sensor, the sensor means 32 would preferably be arranged in the region of a mount (not shown) of the motor drive 25 on a housing (not shown) of the dispensing means 12. In the case of a current sensor, the sensor means 32 would be arranged, for example, on an electrical supply line to the motor drive 25.

The device 10 also includes an operator terminal 36, with which the user can, for example, select different operating modes of the device 10. Furthermore, the device 10 also includes a control and regulating means 38, which comprises a microprocessor (not shown) as well as a memory (not shown). Among other things, this control and regulating means 38 receives a signal from the sensor means 32, and controls the dispensing means 12, for example the motor drive 25 for the starting material 16, as well as the filling means 22 and the sealing means 24.

The device 10 operates as follows: at the control terminal 36, the user selects the number of air-filled bags 18*a*, 18*b*, . . . to be dispensed by the dispensing means 12 for withdrawal in the withdrawal region 28 in a dispensing operation. By way of example only, the number of bags 18 to be dispensed is presently 1. Then, the dispensing means 12 is started and the bag 18*a* already mentioned above is provided in the withdrawal region 28. This bag 18*a* thus hangs out of the machine output 26. Said bag is still connected, by means of the above-mentioned perforation 19, to the other bag 18*b* that is already manufactured, but has not yet fully arrived in the withdrawal region 28.

After dispensing said bag 18*a* in the withdrawal region 28, the dispensing means 12 is automatically stopped by the control and regulation means 38. The bag 18*a* is thus stationary in the withdrawal region 28. Now the user grips with his hand 30 from the outside into the withdrawal region 28, grasps the bag 18*a* and tears it off the perforation 19 from the bag 18*b*. The user thus engages the dispensed cushion means 18. This results in a tensile force on the bag 18*b* and on the further bags extending to the motor drive 25 that are connected with the bag 18*b* by means of corresponding perforations and are already manufactured, which is indicated in FIG. 1 by a dashed double line.

Thus, this tensile force ultimately also acts on the motor drive 25, which in the present case is, for example, an electric motor having a stator and a rotor, where it results in a corresponding "state change." This tensile force causes a change in the signal state on the above-mentioned force sensor and/or torque sensor. However, the tensile force can also lead to a (small) movement of the rotor relative to the stator, whereby a current is detected, which is detected by the above-mentioned current sensor or causes a change in the signal state in said sensor.

This change in the signal state is transmitted from the sensor means 32 to the control and regulating means 38, and thereby a timer of the control and regulating means 38 is set in motion. The timer defines a predetermined time interval. The length of the time interval can be set by the user at the operating terminal 36. Alternatively, the time interval can also be fixed. In general, the time interval is a few seconds. In principle, however, the time interval can also be 0. After expiration of the time interval, the dispensing means 12 is controlled by the control and regulating means 38 in such a way that the next bag (that is to say the bag 18*b* in the present case) is dispensed in the withdrawal region 28.

Figure 2:
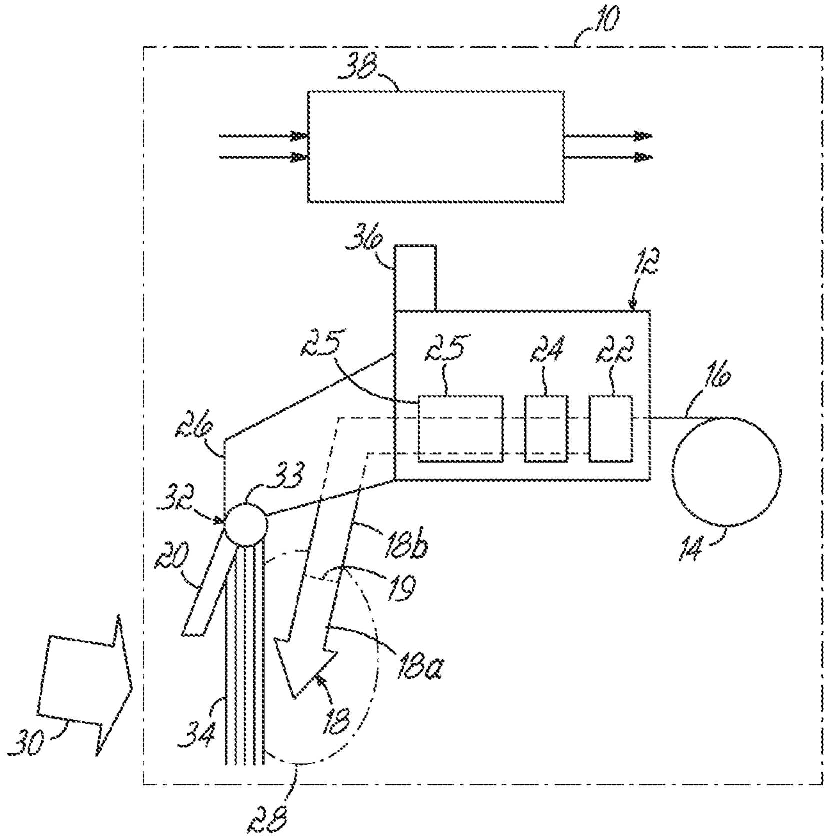
FIG. 2 shows a schematic representation of a second embodiment of a device for dispensing a cushion means for packaging purposes.

An alternative embodiment is shown in FIG. 2. This differs from the embodiment of FIG. 1, especially by the nature and arrangement of the sensor means 32.

In the embodiment of FIG. 2, the sensor means 32 is present at the lower outer edge of the machine output 26. Through this, a presence and a non-presence of a hand of the user 30 in the withdrawal region 28 can be detected. The sensor means 32 in the present case is an ultrasound detector 33 which generates an ultrasound region 34. This extends vertically downwards in the present case like a curtain of the ultrasonic detector 33. When the hand of the user 30 breaks through the ultrasonic region 34 of the ultrasonic detector 33 by the hand 30 entering the withdrawal region 28, a signal state of the ultrasonic detector 33 changes. When the hand of the user 30 leaves the ultrasound region 34 of the ultrasound detector 33 again by retracting the hand 30 from the withdrawal region 28, the signal state of the ultrasound detector 33 also changes.

In an embodiment (not shown) the sensor means may also comprise an image recognition device, for example a camera. In a further embodiment (not shown), the sensor means may comprise an infrared detector or a light barrier.

The device 10 of FIG. 2 initially operates identically to the device 10 of FIG. 1. After dispensing the bag 18*a* in the withdrawal region 28, the dispensing means 12 is automatically stopped by the control and regulating means 38. The bag 18*a* is thus stationary in the withdrawal region 28. Now the user grips with his hand 30 from the outside into the withdrawal region 28, grasps the bag 18*a* and tears it off the perforation 19 from the bag 18*b*. In doing so, it breaks through the ultrasound region 34, as a result of which the signal state of the ultrasound detector 33 changes, for example, from a state 0 to a state 1. This change in the signal state is transmitted to the control and regulating means 38. This change in the signal state causes the control and regulating means 38 to prevent any new dispensing of bags 18 at first.

The user now engages the bag 18*a* present in the withdrawal region 28 with his hand 30 and retracts his hand 30 together with the bag 18*a* out of the withdrawal region 28 counter to the direction of the arrow in FIG. 1. In this case, the bag 18*a* is separated from the remaining bag 18*b* still present in the machine output 26 at the perforation 19 by means of the tear-off means 20.

When the hand 30 retracts out of the ultrasound region 34, this also results in a change in the signal state of the ultrasound detector 33, in the present example from a state 1 to a state 0. By this change of the signal state, a timer of the control and regulating means 38 is set in motion. The timer defines a predetermined time interval. The length of the time interval can be set by the user at the operating terminal 36. Alternatively, the time interval can also be fixed. In general, the time interval is a few seconds. In principle, however, the time interval can also be 0. After expiration of the time interval, the dispensing means 12 is controlled by the control and regulating means 38 so that three bags 18 are again dispensed in the withdrawal region 28.

The user can now grasp again with his hand 30 in the withdrawal region 28, so that the process described above can be carried out anew.

It is understood that in this embodiment it is basically also conceivable that the cushion means 18 are chips or pellets ("loose fill") made of foamed plastic, or plastic bags which are filled with a self-foaming material.

A further embodiment of a device 10 for dispensing a cushion means 18 for packaging purposes will now be explained with reference to FIG. 3.

In this embodiment, a photoelectric sensor 39 forming the sensor means 32 is located behind a separating aid 40, as seen by the user, whereas the withdrawal region 28 is located in front of the separating aid 40, as seen by the user. The separation aid 40 is an approximately U-shaped sheet metal construction, when seen in plan view from the front, having two lateral and approximately vertical legs 40*a* and a transversely and approximately horizontally extending base 40*b*. The two legs 40*a* have an L-shaped cross-section, each having a front wall 40*c* and a side wall 40*d*. Between the two legs 40*a*, a slot-like opening 41 is provided, which, as seen by the user before the separation aid 40, connects the withdrawal region 28 with a detection region 42 provided behind the separation aid 40, as seen by the user. The light barrier 39 forms a jet-like line-like light curtain 44 between the two lateral walls 40*d*.

The cushion means 18 is conveyed from above from a dispensing region 46 down into the withdrawal region 28. In the dispensing region 46, the cushion means 18 passes through a dispensing means (not shown here) and which can basically be constructed in a similar manner to the dispensing means 12 explained above in connection with FIGS. 1 and 2. In principle, however, it is also conceivable for a buffer means to be arranged between the dispensing region 46 and the dispensing means, for example in the form of a silo. Again, the cushion means 18 is symbolized by an arrow. After the end of the conveying, the cushion means 18 hangs down in the withdrawal region 28.

In the present case, the cushion means 18 are again air-filled bags, which are detachably connected to one another via a perforation indicated by dots 19 in the Figure. In order to remove the bag 18 located in the withdrawal region 28, the user grasps again with his hand, which is symbolized by an arrow 30 in FIG. 3, from the front into the opening 41 of the separation aid 40. During this movement, he pierces the perforation 19, so that the bags provided below the perforation 19 can be separated and grasped by the hand of the user. During this movement, however, a part of the outstretched fingers of the hand also passes through the opening 41 into the detection region 42 arranged behind the separating aid 40 and into the light curtain 44 of the light barrier 39 present there.

As a result, the light barrier 39 is interrupted, whereby the presence of a region, namely a few fingers of the outstretched hand 30 of the user is detected in the detection region 42 immediately adjacent to the withdrawal region 28. Analogously to the above, this results in a signal change, which is transmitted from the light barrier 39 to the control and regulating means. If the user retracts his hand 30 together with the separated bags 18, the interruption of the light barrier 39 ends, which in turn results in a signal change, which is transmitted to the control and regulating means. Either immediately or again only after expiry of a time interval, a new amount of cushion means 18 is provided in the withdrawal region 28 after this last signal change.

A fourth embodiment of a device 10 for dispensing a cushion means 18 for packaging purposes will now be explained with reference to FIG. 4.

Figure 3:
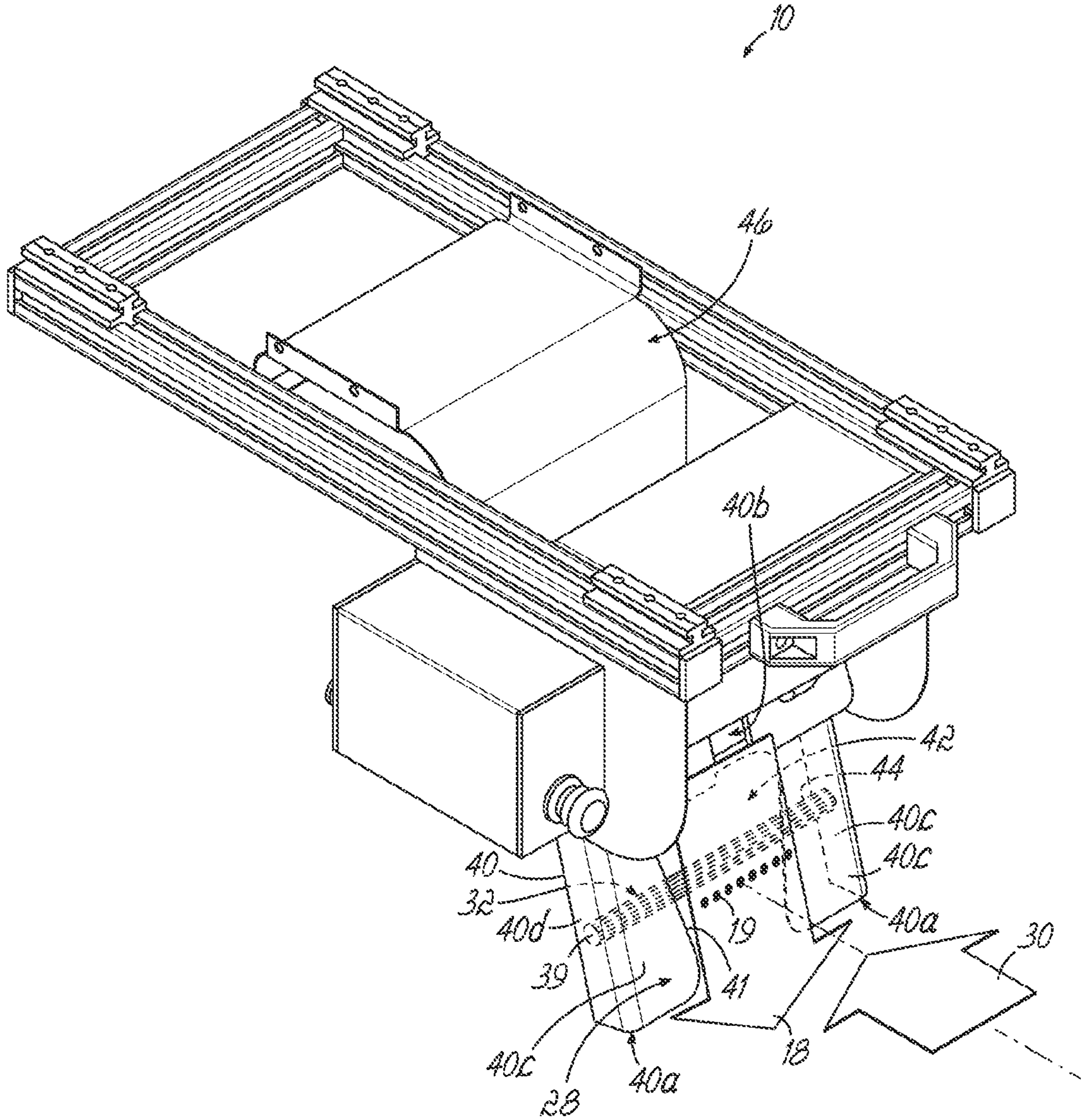
FIG. 3 shows a perspective detailed illustration of a possible withdrawal region of a third embodiment of a device for dispensing a cushion means for packaging purposes.
Figure 4:
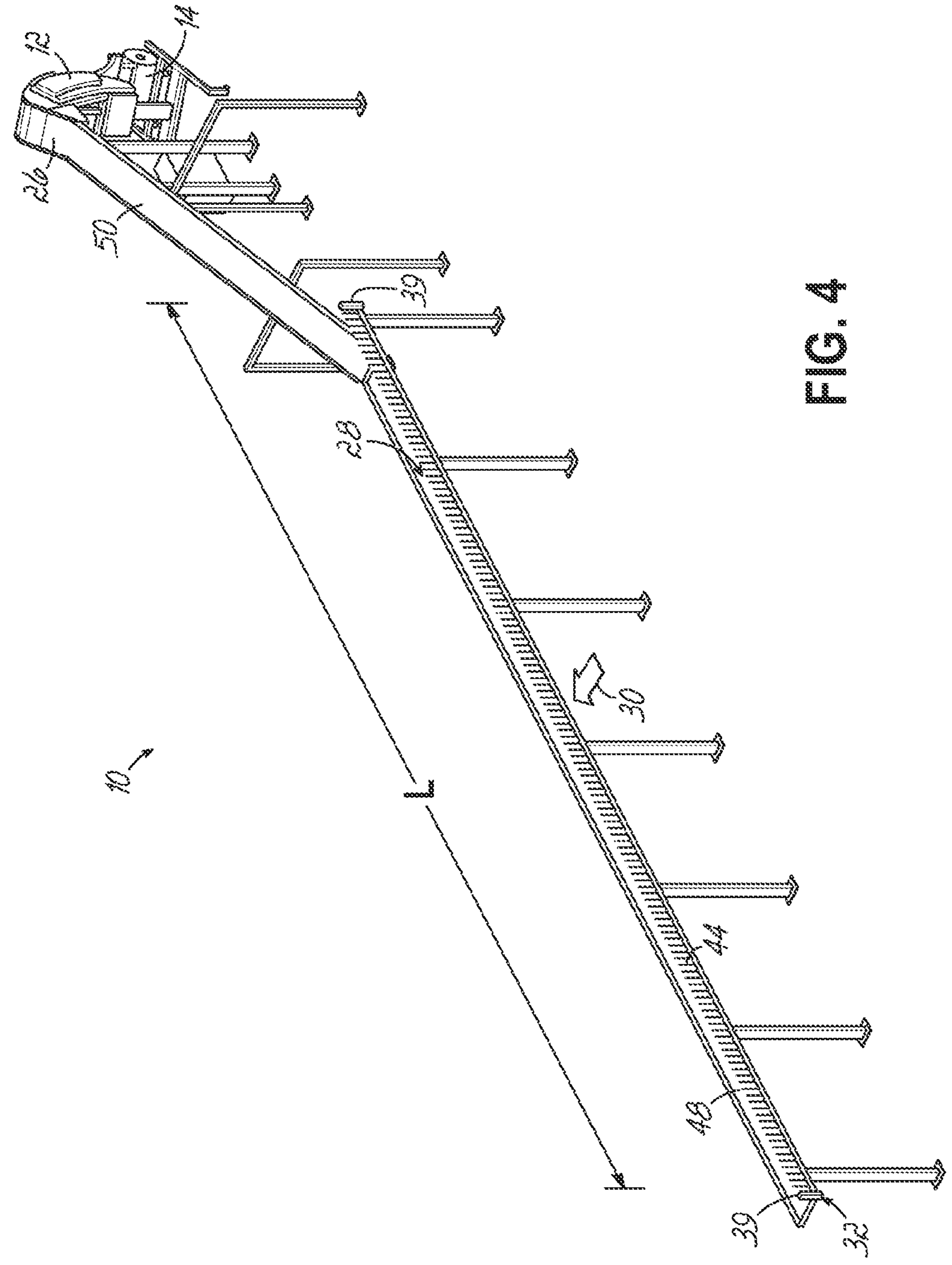
FIG. 4 shows a perspective view of a fourth embodiment of a device for dispensing a cushion means for packaging purposes.

In the device 10 shown in FIG. 4, the withdrawal region 28 is arranged away from the dispensing means 12. In this case, the withdrawal region 28 is formed like a line and directly above a conveyor belt 48, so that it extends over a length L. A transport means in the form of a chute 50 is arranged between the dispensing means 12 and the conveyor belt 48, said chute transporting, in operation, a cushion means (not shown in FIG. 3) dispensed by the dispensing means 12 to the conveyor belt 48.

Laterally from the withdrawal region 28, a sensor means 32 in the form of a light barrier 39 is arranged, which generates a light curtain 44 over the entire length L of the withdrawal region 28, which is indicated in FIG. 4 by vertical lines. It is understood that the light curtain 44 does not necessarily have to be flat, but can only consist of a single line-like light beam.

The device 10 shown in FIG. 4 operates as follows: first, i.e. at the start of operation, the cushion means is produced by the dispensing means 12, which reaches the conveyor belt 48 by means of the chute. Said conveyor belt is in operation and transports the cushion means provided on the conveyor belt 48 to the left in FIG. 4. When the first cushion means produced reaches the left end of the conveyor belt 48, it is detected by a sensor (not shown) located there, thereby stopping the conveyor belt 48. The dispensing of cushion means by the dispensing means 12 is also terminated. In this state, the conveyor belt 48 is covered over its entire length L with cushion means.

The cushion means may be the above-mentioned air-filled plastic bags or individual cushioning pads made of crumpled paper. Such cushioning pads may be tubular, star-shaped or butterfly-like in cross-section. In the following, it is assumed, by way of example, that the cushion means consists of individual cushioning pads made of crumpled paper.

If a user now grasps again with his hand, which is also symbolized in FIG. 4 by an arrow 30, from the side into the withdrawal region 28 and grasps a cushioning pad lying on the conveyor belt 48, he breaks through the light curtain 44, resulting in a first signal change, as already mentioned above in connection with the other two exemplary embodiments. Now the user pulls his hand back together with the cushioning pad, thereby creating a gap at this point on the conveyor belt 48. As a result of the hand 30 leaving the light curtain 44 again, a second signal change is produced, which in turn is transmitted to the control and regulating means 38. This has the effect that the control and regulating means 38 first controls the dispensing means 12, so that it produces a new cushioning pad, which then reaches the conveyor belt 48 via the chute 50.

But the control and regulating means 38 also controls the conveyor belt 48, whereby this is set in motion for a predetermined time. However, the cushioning pad produced to the left of the existing gap in FIG. 4 cannot be moved even when moving the conveyor belt 48, since the leftmost cushioning pad in FIG. 4 abuts a stop (not shown) on the left end of the conveyor belt 48 in FIG. 4. Only the cushioning pads present in FIG. 4 to the right of the resulting gap are moved further, so that the gap is closed and the newly produced cushioning pad can reach the conveyor belt 48 from the chute 50. The conveyor belt 48 is thus again complete, i.e. occupied in a "gapless" manner with cushioning pads.

In the embodiment shown in FIG. 4, the transport means which connects the dispensing means 12 and the withdrawal region 28 is designed as a chute 50, which operates "passively" by gravity and cannot be controlled. In an embodiment (not shown), the transport means could also be an "active" transport means, for example a conveyor belt, which could then also be controlled depending on the detection of a part of the hand of the user in the detection region, and possibly also only after a time interval.

In the embodiments of FIGS. 2-4 described above, both the signal change generated when the hand of the user entered the withdrawal region or detection region and the signal change generated when retracting the hand of the user from the withdrawal region or detection region were detected. It is understood that in principle only one of these signal changes can be used to control the dispensing means and/or the transport means so that a new cushion means is dispensed to the user.

The invention claimed is:

1. A device for dispensing a cushion means for packaging purposes, comprising dispensing means for dispensing said cushion means, a withdrawal region from which a user may withdraw said dispensed cushion means, and at least one sensor means which detects, at least indirectly, an engaging of the dispensed cushion means by the user and/or the presence of at least one region of a hand of the user in the withdrawal region or in a detection region adjacent to the withdrawal region, wherein the dispensing means dispenses a cushion means when the sensor means detects an engaging of the dispensed cushion means by the user and/or the presence of the at least one region of the hand of the user in the withdrawal region or in the detection region, wherein the dispensing is done by conveying the cushion means towards the withdrawal region.

2. The device of claim 1, wherein the dispensing means dispenses the cushion means such that a first region of the cushion means that can be withdrawn is detachably connected to a second region of the cushion means, and that the sensor means detects at least an indirect action by the user on the second region of the cushion means with the withdrawal of the first region of the cushion means.

3. The device of claim 2, wherein the dispensing means comprises a motor drive, and that the sensor means detects a change in the state of the motor drive due to the at least indirect action by the user on the second region of the cushion means.

4. The device of claim 1, wherein the sensor means changes a signal state when at least one region of a hand enters the withdrawal region or the detection region.

5. The device of claim 1, wherein the sensor means changes a signal state when at least one region of a hand leaves the withdrawal region or the detection region.

6. The device of claim 1, wherein the sensor means comprises a light barrier, an image recognition means, an infrared detector, and/or an ultrasound detector, in or on the withdrawal region or the detection region.

7. The device of claim 1, wherein the sensor means comprises a torque sensor, a force transducer, and/or a current sensor, at a motor drive of the dispensing means.

8. The device of claim 1, wherein the withdrawal region or the detection region is arranged directly on the dispensing means.

9. The device of claim 1, wherein the withdrawal region is arranged away from the dispensing means, and that a transport means is arranged between the dispensing means and the withdrawal region, which transports a cushion means dispensed by the dispensing means to the withdrawal region.

10. The device of claim 9, wherein the transport means transports a cushion means depending on the engaging of the provided cushion means by the user and/or the detected presence and/or absence of the at least one region of the hand of the user in the withdrawal region or in the detection region.

11. The device of claim 10, wherein the transport means only initiates a transport after expiration of a predetermined time interval after a detected engaging of the dispensed cushion means by the user and/or for a detected presence and/or absence of a hand of the user in the withdrawal region or in the detection region, and/or that the dispensing means only dispenses a cushion means after a predetermined time interval after a detected engaging of the dispensed cushion means by the user and/or detected presence and/or absence of the at least one region of the hand of the user in the withdrawal region or in the detection region.

12. The device of claim 1, wherein the withdrawal region or the detection region extends over a length, and the sensor means which detects the presence and/or absence of at least one region of a hand of the user in the withdrawal region or in the detection region is arranged and formed such that it acts over at least part of the length of the withdrawal region or the detection region.

* * * * *